3,796,806
FLUID SHORTENING MANUFACTURE
Michael J. McCarthy, Oklahoma City, Okla., assignor to Swift & Company, Chicago, Ill.
No Drawing. Filed Mar. 29, 1971, Ser. No. 129,275
Int. Cl. A23d 5/00
U.S. Cl. 426—417                                  7 Claims

ABSTRACT OF THE DISCLOSURE

Fluid shortening compositions are prepared from normally plastic shortening agents by melting the plastic shortening agent, and then cooling same in the presence of a suitable crystal inhibitor. The presence of the crystal inhibitor in the mixture acts to fluidize the normally plastic shortening agent.

SPECIFICATION

The present invention relates to an improved method for manufacturing pumpable, fluid shortening compositions, and to the shortening compositions so prepared. More particularly, the present invention relates to a method of preparing a fluid shortening which method comprises melting a normally plastic shortening agent, adding a crystal inhibitor, and subsequently cooling the composition in order to induce the formation of crystals of normally solid glycerides without forming crystals of normally liquid glycerides.

Because of the significantly greater convenience in storing, pumping, and metering liquid shortening compositions, there has been a constantly increasing demand for the availability of such fluidized shortenings. This demand is particularly strong in the baking industry where shortenings and lard find their greatest use. In large-scale, commercial bakery operations, and particularly in continuous process bakery operations, plastic shortenings present difficulties in handling as they cannot be poured, pumped or membered, and thus are not suitable for being added continuously to batters at controlled rates. Various fluid shortening compositions have been proposed to overcome this difficulty. These compositions are usually suspensions of solid fats in normally liquid glyceride vehicles. For example, in U.S. Pat. No. 2,815,286 to Andre et al. a liquid shortening composition is disclosed as comprising 2–10% solid glycerides dispensed in 90–98% normally liquid glycerides. Also, in U.S. Pat. No. 2,521,219 to Holman et al. a pumpable shortening composition is disclosed wherein 10–60% normally solid glycerides are suspended in 40–90% normally liquid glycerides. Similarly, U.S. Pat. No. 3,234,029 to Bruce discloses a fluid shortening composition comprising normally liquid triglyceride fat, normally solid triglycerides, and fatty ester emulsifiers. Other references which disclose liquid shortening compositions are U.S. Pats. 3,047,402 to Schmidt and 3,325,292 to Endres et al.

While these fluid shortenings overcome handling difficulties, they are disadvantages in that the normally liquid vegetable oils which make up a large proportion of these fluid compositions are more costly than, for example, animal fats such as lard and tallow which can be used in plastic shortening compositions. Also, while vegetable oil-based fluid shortenings are more convenient to handle than plastic shortenings, they offer no particular advantage as far as the quality of many bakery products, such as bread is concerned. Thus when the price of vegetable oils is higher than the price of lard, the baker must pay a premium for the convenience of a fluid shortening, and may therefore revert to the use of plastic, lard-based shortenings.

Heretofore, fluid shortenings have not been prepared from normally plastic, fatty compositions. It would therefore be a significant advance in the art if a method were provided for manufacturing fluid shortenings using lard or other normally plastic fats as the glyceride vehicle.

It is accordingly a principal object of the present invention to provide an improved method for preparing fluid shortenings.

It is a further object of the present invention to provide an improved method for converting normally plastic shortening agents into fluid shortenings.

Another object of the present invention is to provide an improved lard-based shortening composition which is a pumpable fluid.

It is yet another object of the present invention to prepare a shortening composition comprising lard fluidized by the presence of a crystal inhibitor.

Basically, the present invention contemplates a method of preparing fluid shortening compositions from normally plastic glycerides. The normally plastic glycerides, lard for example, is melted and a crystal inhibitor is added to the liquid melt. The melt is then cooled to about ambient temperatures so that normally solid glyceride components of the plastic agent will crystallize. The presence of the crystal inhibitor acts to prevent co-crystallization between normally liquid glyceride components and the normally solid glycerides, thus preventing the reforming of the characteristic plastic structure of the shortening agent.

"Plastic shortening agent," for the purposes of this invention, is defined as denoting either lard or conventional shortening compositions. Lard is a plastic shortening agent prepared from hog fat. The composition and characteristics of lard are subject to wide variation, and are affected by the feed of the hog, and are different for lard rendered from different parts of the same animal. The most common type of lard is prime steam lard which is prepared by wet rendering of hog fat in closed tanks under steam pressure.

Conventional shortenings are plastic compositions which fall into two overlapping classes: (1) all-hydrogenated shortenings prepared from hydrogenated vegetable oils, and (2) compound shortenings prepared by blending vegetable and/or animal fats, which may or may not be hydrogenated. For example, a compound shortening may comprises a major amount of a soft vegetable oil and a minor amount of a hard animal fat, or a major amount of a soft vegetable oil and a minor amount of a highly hydrogenated vegetable oil, or a major amount of lard and a minor amount of a hard animal or vegetable fat. When the normally plastic shortening agent is an all-hydrogenated shortening, or otherwise contains a major amount of soft or partially hydrogenated vegetable oil, it is called a vegetable oil-based shortening composition. On the other hand, when the normally plastic shortening agent contains a major amount of lard, it is called a lard-based shortening composition.

Generally, plastic shortening agents, whether lard or conventional shortening, are characterized by their distinctive plastic structure. These plastic compositions consist of many small, discrete crystals enmeshing a considerable portion of liquid oil which is firmly held within the crystal mass by surface tension. The plasticity of the shortening agent is due to its content of solid glycerides which are crystallized in such a manner that they form a random network of crystals throughout the liquid glyceride. Plastic fats in their form-retaining range may contain from 5 to 50% solids, but usually contain from 10 to 30%, and preferably 15 to 25% solids. The enmeshed liquid oils comprise the major amount of the plastic shortening agent, the greatest part of these liquid oils being relatively low melting triglycerides.

According to the method of this invention, a normally plastic shortening agent is heated until it is completely melted. The heating temperature and length of time required will of course be a function of the particular plastic glycerides being melted. Usually, heating at about 160° F. is sufficient to melt the glycerides. An amount of crystal inhibitor sufficient to prevent cocrystallization between the normally liquid and normally solid glyceride components is then added to the liquid melt. The liquid melt is subsequently slowly cooled to about ambient temperatures, or a little above ambient temperatures. Rapid cooling is generally avoided as this causes formation of large, unstable crystals. Preferably, the slow cooling is accompanied by agitation sufficient to prevent excessive viscosity build-up during the cooling and crystallization operation. The solid glyceride components are crystallized in the stable beta form, and cocrystallization of the solid glycerides with the normally liquid triglycerides is minimized. The resulting shortening is a fluid product which retains its fluidity at temperatures above about 70° F. for prolonged periods of time. In particular, the fluid shortening products of this invention remain pumpable at temperatures as low as from about 70° F. to about 85° F. Generally, a viscosity of less than about 30 poises in this temperature range constitutes a suitable viscosity for the pumpable, fluid shortening.

The fact that a fluid composition can be prepared by the above method is quite surprising. For example, treating a plastic shortening agent in the same manner, without the addition of the crystal inhibitor, will result in a grainy, nonpourable product. Similarly, if a shortening melt including the crystal inhibitor is cooled in such a manner that cocrystallization of the solid glycerides with the liquid glycerides is allowed to occur, a nonpourable product is also obtained. The fluid composition of the present invention is even more surprising when compared with the fluid shortenings of the prior art which are composed of a suspension of finely-divided, normally solid glycerides in a normally liquid glyceride vehicle. The normally liquid glyceride vehicle is usually a vegetable oil containing a negligible percentage of glycerides which crystallize at ambient temperatures or in the temperature range where the product is fluid. On the other hand, shortening compositions produced by the present method differ in that the glyceride vehicle is not normally fluid, and may contain from about 10% to about 25% of solid glycerides in the temperature range where the product remains fluid.

The present method also contemplates the addition of various other solid glycerides to the normally plastic vehicle prior to or during the heating and melting stages. The solid glyceride additives may be of animal or vegetable origin, and may be triglycerides, diglycerides, monoglycerides, or mixtures thereof. Triglycerides with an iodine value of less than about 15, and with a melting point greater than about 120° F. are suitable. The level of hard triglycerides added to the normally plastic vehicle may be as high as about 20% based on the weight of the final composition. However, if monoglycerides or diglycerides are used as additives, they should not be present in amounts of greater than about 10%, based on the weight of the fluid composition. Examples of solid glycerides which could be added include hydrogenated lard, hydrogenated vegetable oils, hydrogenated marine oils, oleostearine, tallow, and vegetable stearines.

The normally plastic glyceride vehicle utilized in the present invention may be any plastic shortening agent including lard and conventional shortenings. Of primary importance is the use of lard as the glyceride vehicle. Also of great importance is the use of lard-based shortenings as the glyceride vehicle. Such lard-based shortenings may comprise from about 80% to 100% lard, along with from 0% to about 20% of a normally solid glyceride additive. Also of importance as the glyceride vehicle are the conventional plastic shortenings prepared from partially hydrogenated vegetable oils, such as partially hydrogenated cottonseed oil, soybean oil, coconut oil and peanut oil. Similarly blends of vegetable oils and hard animal fats could serve as the glyceride vehicle. Generally, the normally plastic glyceride vehicle will have a composition such that upon cooling the vehicle from 100° F. to 60° F., the glyceride vehicle will exhibit an increase in solids content of greater than 20% on a weight basis.

The crystal inhibitor utilized in the present invention may be any agent which is effective in preventing or minimizing the growth of glyceride crystals. Preferably, the crystal inhibitor will be an edible agent of the type used in the manufacture of winterized salad oils. The specific crystal inhibitor used is not a critical aspect of the invention. Rather, all edible inhibitor agents well-known in the art as salad oil winterizing agents are suitable. Some crystal inhibitor agents used in the manufacture of salad oils are those disclosed in U.S. Pats. 2,050,528; 2,097,720; 2,266,591; 2,418,669; 2,518,917; 2,524,732; 2,610,915; 3,158,489; and 3,158,490. Examples of types of crystal inhibitors effective in the present invention include commercial lecithin, aluminum tristearate, oxidized polymerized oils (brown oils), fatty acid esters of dextrin, fatty acid esters of disaccharides (such as sucrose esters), and the fatty acid esters of polyglycols, sorbitol, and other higher alcohols. Also, mixtures of two or more crystal inhibitors may be satisfactorily utilized.

The amount of crystal inhibitor added to the normally plastic glyceride vehicle will be a function of the type of crystal inhibitor used and the amount and type of hard glycerides present in the composition. Generally however, the amount of crystal inhibitor will range from about 1% to about 10%, and preferably from about 2% to about 5%, based on the weight of the plastic vehicle. The less than 1% level of crystal inhibitor common in most salad oils is ineffective in conjunction with the present invention.

Although it is not desired to be bound by theory, it is believed that the crystal inhibitor acts in the following manner to prevent reforming of the characteristic plastic structure upon cooling of the normally plastic glyceride vehicle. The normally solid glycerides of the plastic glyceride vehicle have melting points and crystallization temperatures higher than those of the major constituents (the enmeshed liquid triglycerides) of the plastic shortening agent. Thus, by carefully controlling the cooling of the shortening agent, it is possible to crystallize the majority of the normally solid glycerides, obtaining these in the desired stable beta form, without cocrystallization of the normally enmeshed liquid glycerides. It is felt that the crystal inhibitor is present at a concentration exceeding its solubility at the crystallization temperature of the solid glycerides. The crystal inhibitor therefore precipitates and, instead of settling, coats the surface of the stable beta crystals, thereby preventing further crystal growth or participation of the coated crystal in further crystallization processes. The crystal inhibitor which remains in solution inhibits the crystallization of the enmeshed liquid glycerides so that the product remains fluid. If the temperature of the fluid product is lowered to a point where the enmeshed triglycerides crystallize, the product may become very viscous, to the point where it is nonpourable. Since the crystals of the normally solid glycerides are coated with a thin film of crystal inhibitor, they are protected from interacting in the crystallization of the enmeshed triglycerides. Hence, if the temperature is raised to the point where the majority of the enmeshed triglycerides are normally fluid, the shortening product will again obtain a fluid state. The following examples are illustrative only and are not to be construed as limiting the scope of the invention.

EXAMPLE I 400 grams of prime steam lard was mixed with 20 grmas of commercial grade bleached lecithin in a beaker. The mixture was heated to 150° F. on a hot plate. The beaker and its contents were then transferred to an ice bath and the mixture cooled to 100° F., with stirring.

During the cooling, the sides of the beaker were continually scraped to prevent build-up of solidified fat. The chilled fat was then transferred to a temperature controlled room where it was stored at 80° F. The product retained its fluid state for extended periods.

EXAMPLE II 400 grams of prime steam lard without lecithin was treated in a manner identical to that of Example I. After about 48 hours storage, a grainy, nonpourable, semisolid product was obtained.

EXAMPLE III 400 grams of prime steam lard and 20 grams of polyoxyethylene sorbitan tristearate was treated in a manner identical to that of Example I. The product retained its fluid state for extended periods.

EXAMPLE IV 400 grams of prime steam lard and 20 grams of polyoxyethylene sorbitan trioleate was treated in a manner identical to that of Example I. The product retained its fluid state for extended periods.

EXAMPLE V 400 grams of prime steam lard and 20 grams of sorbitan monostearate was treated in a manner identical to that of Example I. The product retained its fluid state for extended periods.

EXAMPLE VI

A mixture composed of 890 grams of prime steam lard, 40 grams lecithin, 50 grams of lard hydrogenated to an iodine value of approximately 8, and 20 grams of glycerol monostearate (Myverol 1800) was heated to 160° F. to a molten condition. The formulation was then allowed to cool slowly (2–3 hours) while stirring by means of a motor driven stirrer until the temperature reached 95° F. The product was then transferred to a room maintained at 85° F. A portion of the product was stored under fluctuating room temperatures of 60–95° F. Product maintained at 85° F. retained its fluid condition for extended periods. Product held in the fluctuating temperature area was a nonpourable semisolid at temperature below 75° F. but reverted to a fluid state whenever the temperature of the product was above 80° F.

EXAMPLE VII

Product with composition identical to that of Example VI was rapidly chilled (2–5 minutes) to 95° F. and then transferred to a room maintained at 85° F. A grainy, nonpourable semisolid product was obtained.

EXAMPLE VIII

Product with composition of Example VI, with the exception that soybean oil hydrogenated to an iodine value of 1.6 was used at the same level as the hydrogenated lard, was treated in a manner identical to that given in Example VI. Product which retained a fluid condition at temperatures above 75° F. was obtained.

The shortening compositions prepared in Examples I, III–VI, and VIII above all had utility in the preparation of baked foods, and all could be stored under fluid conditions for a period of time of several days to several months.

Obviously, many modifications and variations of the invention as hereinbefore set forth may be made without departing from the spirit and scope thereof, and therefore only such limitations should be imposed as are indicated in the appended claims.

I claim:

1. A method of preparing a fluid shortening composition comprising heating a normally plastic shortening agent to obtain a complete liquid melt; adding from about 1% to about 10%, based on the weight of said shortening agent, of a crystal inhibitor; and thereafter slowly cooling the liquid melt with agitation to a temperature of from about 70° F. to about 85° F. whereby the normally solid glyceride components of the plastic agent crystallize in the stable beta form.

2. The method of claim 1 wherein the crystal inhibitor is selected from the group consisting of commercial lecithin, blown oils, fatty acid esters of dextrin, fatty acid esters of disaccharides, fatty acid esters of sorbitol, and the fatty acid esters of polyglycols.

3. The method of claim 2 wherein up to about 20% additional solid glycerides are added to the normally plastic shortening agent before fluidizing same with the crystal inhibitor.

4. The method of claim 2 wherein from about 2% of about 5% crystal inhibitor is added, and wherein the normally plastic shortening agent is selected from the group consisting of lard, lard-based shortening, and vegetable oil-based shortening.

5. The method of claim 1 wherein the normally plastic shortening agent is lard.

6. The method of claim 5 wherein the crystal inhibitor is selected from the group consisting of commercial lecithin and the fatty acid esters of sorbitol.

7. The method of claim 4 wherein the normally plastic shortening agent is a lard-based shortening comprising lard and up to 20% of a normally solid glyceride selected from the group consisting of hydrogenated lard, hydrogenated vegetable oil, oleostearine, and talolw.

References Cited
UNITED STATES PATENTS

| | | | |
|---|---|---|---|
| 3,117,010 | 1/1964 | Geesler | 99—118 F |
| 3,455,699 | 7/1969 | Bell | 99—118 F |
| 3,528,823 | 9/1970 | Rossen | 99—118 F |
| 2,524,732 | 10/1950 | Mattil | 99—163 X |
| 3,069,270 | 12/1962 | Handschumaker et al. | 99—118 F |
| 2,846,312 | 8/1958 | Lantz et al. | 99—118 F |
| 3,369,909 | 2/1968 | Schroeder et al. | 99—118 F |
| 3,563,766 | 2/1971 | Matsui et al. | 99—118 F |

RAYMOND N. JONES, Primary Examiner